United States Patent [19]

Rodesch et al.

[11] 4,422,105
[45] Dec. 20, 1983

[54] INTERACTIVE SYSTEM AND METHOD FOR THE CONTROL OF VIDEO PLAYBACK DEVICES

[75] Inventors: Dale F. Rodesch, Reno; Nicholas Cerracchio, Las Vegas, both of Nev.

[73] Assignee: Video Education, Inc., Reno, Nev.

[21] Appl. No.: 192,227

[22] Filed: Sep. 30, 1980

Related U.S. Application Data

[63] Continuation-in-part of Ser. No. 83,821, Oct. 11, 1979, abandoned.

[51] Int. Cl.³ .................. G09B 9/00; G11B 15/52; G11B 17/24
[52] U.S. Cl. ................. 358/903; 360/72.1; 360/72.2; 364/415; 364/521
[58] Field of Search .......... 364/415, 419, 521; 340/148, 725; 358/93, 902, 903; 360/72.1, 72.2, 69; 434/307, 308, 309, 315, 316, 321, 323, 335

[56] References Cited

U.S. PATENT DOCUMENTS

| | | | |
|---|---|---|---|
| 3,051,777 | 8/1962 | Lemelson | 178/6.6 |
| 3,501,851 | 3/1970 | Price, Jr. et al. | 35/9 |
| 3,537,190 | 11/1970 | Serrel et al. | 35/9 |
| 3,541,271 | 11/1970 | Joslow et al. | 179/100.2 |
| 3,564,161 | 2/1971 | Takishima et al. | 179/100.2 |
| 3,623,157 | 11/1971 | Stapleford et al. | 340/172.5 |
| 3,727,203 | 4/1973 | Crossman | 340/174.1 |
| 3,745,531 | 7/1973 | Staas, Jr. | 340/172.5 |
| 3,804,993 | 4/1974 | Hannold et al. | 179/100.1 |
| 3,851,116 | 11/1974 | Cannon | 179/100.2 |
| 3,869,720 | 3/1975 | Ohira et al. | 360/72 |
| 4,148,070 | 4/1979 | Taylor | 358/903 X |
| 4,161,728 | 7/1979 | Insam | 358/903 X |
| 4,177,462 | 12/1979 | Chung | 358/903 X |

OTHER PUBLICATIONS

Broadbent/A Review of the MCA Disco-Vision System/SMPTE-Journal, p. 554-559, Jul. 1974, vol. 83.
Bennion & Schreider/Interactive Videodisc Systems for Education/SMPTE-Journal, p. 949-953, Dec. 1975, vol. 84, No. 12.

*Primary Examiner*—Felix D. Gruber
*Attorney, Agent, or Firm*—Flehr, Hohbach, Test, Albritton & Herbert

[57] ABSTRACT

The invention provides an interactive system and method for the control of video playback devices such as video tape recorders. The system allows user interaction with a prerecorded program which includes live video displays and alphanumeric displays. The user can select the program desired and also inputs answers to specific questions asked by the program. A standard video playback device is modified by the addition of a small computer and memory circuit, and character display circuitry. The invention operates the video playback device to produce a video output. Prerecorded program information includes data dumps interspersed with video display segments and the data in the data dumps is recovered by a data recovery circuit. The computer then commands the video playback device to access different portions of the recorded video program in response to user input and the operating instructions provided by the data recovered.

14 Claims, 10 Drawing Figures

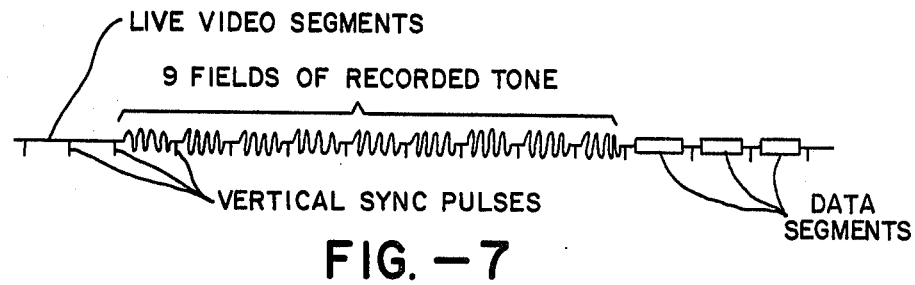
FIG.—7
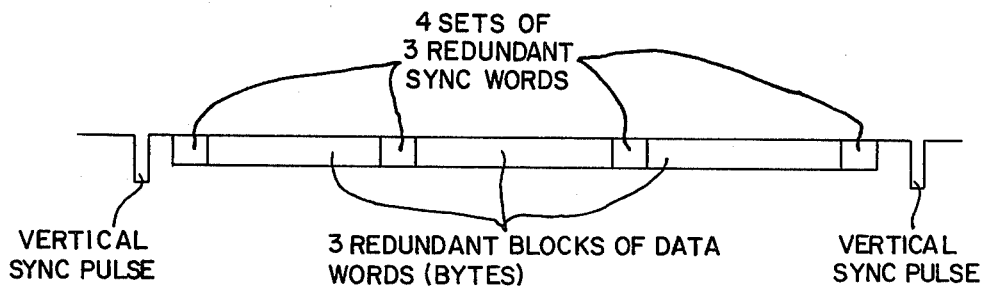
FIG.—8
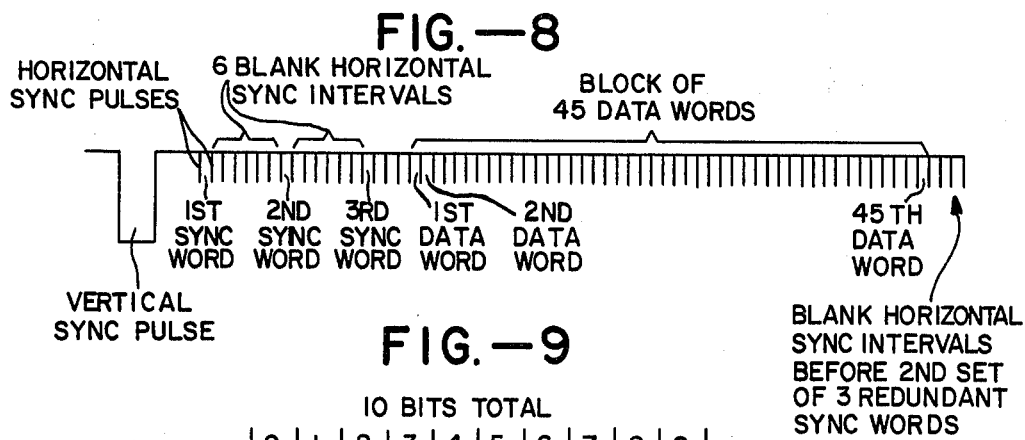
FIG.—9
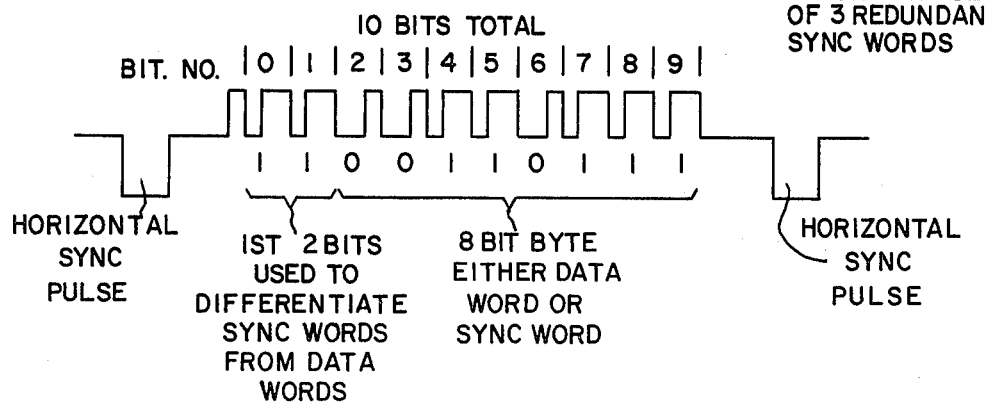
FIG.—10

INTERACTIVE SYSTEM AND METHOD FOR THE CONTROL OF VIDEO PLAYBACK DEVICES

This application is a continuation-in-part of application Ser. No. 06/083,821, filed Oct. 11, 1979 now abandoned.

The present invention relates generally to video playback devices and more specifically to a system and method of automatically controlling a video playback device in response to user input to provide an interactive video display.

The increased availability of relatively compact video playback devices, and the continuing increase in the quality and convenience of such devices, has led to new uses for packaged video programming. One area where video playback devices are particularly useful is teaching. Schools, business and industry are all able to make use of prerecorded programs for instruction. Another use of video programming is in testing of students, wherein prerecorded examination questions can be asked, together with demonstrative material. Given the growing use of video playback devices such as home video recorders, the availability and variety of instructional programs will continue to increase.

One serious limitation on the use of conventional video playback devices for instructional purposes is the impracticality of tailoring the instructional material to individual viewers. Whereas an instructor can rapidly cover areas quickly grasped by a student, and repeat and enlarge on points which give trouble, a prerecorded video program simply continues on at its own pace. Furthermore, prerecorded video programs are incapable of asking questions and acting on the response given. While computer-controlled interactive teaching machines are available which give individual instruction and are capable of asking specific questions and acting in accordance with the response given, such machines have certain disadvantages. Interactive teaching machines operate under the direct control of a relatively large computer, and thus can be expensive. The machines generally provide computer-generated images on a screen, together with textual matter, and thus do not offer the vivid visual impact of live video displays similar to films or television. Because of their expense, the use of computer-type teaching machines is necessarily limited to establishments where a substantial amount of teaching goes on. Furthermore, teaching machines associated with computers generally cannot be used for other than computer-associated functions. Video recorders can, on the other hand, be put to other uses in the home and industry, and thus are often more cost-effective for the purchaser than a computer teaching machine.

It is an object of the present invention to provide an interactive video system suitable for instructional purposes which incorporates a video playback device capable of playing prerecorded video program material.

Another object of the invention is to provide an interactive video system suitable for instructional purposes which automatically controls the operation of a video playback device to selectively display portions of an instructional video program in response to user input.

Another object of the invention is to provide a method of producing a user interactive video display using a video playback device in which different portions of a recorded video program are accessed in response to user input.

Accordingly, an interactive video system is provided for controlling the display of recorded video information in response to user input. The system uses video playback means for producing a video output from the recorded video information. The system additionally comprises means for recovering data connected to monitor the output of the video playback means and to recover data contained in the recorded video information. A computer responsive to user input is connected to receive data from the data recovery means; the computer also being connected to the video playback means to control the accessing and outputting portions of the recorded video information in response to user input and the data recovered by the data recovery means. The system thereby employs user input interacting with the data contained in the recorded video information to determine the video display produced.

More specifically, an interactive video display system in accordance with this invention includes a video playback device which is adapted to respond to respective ones of a set of input control function commands either to play a prerecorded program medium to recover signal information recorded on a video signal track thereon and produce corresponding video output signals or to fast reverse or forward scan the program medium while recovering medium position information from a control track thereon to produce control track pulse output signals. A video monitor is coupled to the video playback device for receiving video output signals therefrom and producing video displays corresponding thereto. An input control signal means is provided to respond to system users selected input commands to produce corresponding control signals. The display system further includes a microcomputer system including a central processor unit (CPU), an operating program memory, a scratch pad memory, and a plurality of programmable input/output devices communicating with the CPU by way of a system address bus, a system data bus, and a system signal bus. The microcomputer system further includes a control track circuit coupled to the video playback device to receive the control track pulse output signals and is operative to produce a sequence of interrupt signals to the CPU. The microcomputer system further includes a data recovery circuit coupled to the video playback device to receive the video output signal therefrom to recover data words contained therein. A first of the programmable input/output devices is coupled to the video playback device for supplying input control function commands thereto under CPU-program control. A second of the programmable IO devices is coupled to the input control signal means to communicate user generated control commands to the CPU under CPU-program control. A third of the programmable IO devices is coupled to the data recovery circuit to communicate data therefrom to the system data bus so that the data can be operated on or stored.

The interactive video display system is adapted to be controlled by program information provided on the prerecorded program medium in the form of a plurality of groups of live video segments and a plurality of data dump segments with a data identifying signal preceding each data dump segment which can be sensed by the data recovery circuit in conjunction with the CPU to enable operation of the data recovery circuit. Each of the live video segments is preceded by a data dump segment which includes at least one control word identifying the medium location of that data dump segment.

At least one of the data dump segments consists of a software routine in the form of a prearranged sequence of control words which include a set of branching instructions for the CPU to data dump locations associated with selected live video segments and instructions for interpreting a predetermined set of user input commands to operatively select one of the branching instructions. This enables the CPU to respond to one of the set of user input commands to produce either a fast reverse or forward scan function command to the video playback device until an approximate medium location corresponding to the selected new data dump is reached using the interrupt signals received from the control track circuit as a location guide. Thereafter a play function command to the video playback device is produced until the data dump associated with the selected branching instruction is encountered on the prerecorded medium and the live video segment associated therewith is displayed.

Generally the program information on the prerecorded medium will include a plurality of data dumps consisting of prearranged software routines. In accordance with this invention the microcomputer system temporarily stores relevant portions of one of the software routines from an associated data dump in the scratch pad memory while the associated software program is being executed. Thereafter the scratch pad memory is rewritten with another software routine contained in another data dump encountered on the prerecorded medium to enable that software routine to be executed by the microcomputer system. While program menu information, test questions and multiple choice answers, and other alphanumeric displays can be presented to the user utilizing live video segments, in accordance with a preferred embodiment of this invention, at least some of the data dumps consisting of prearranged software routines also include alphanumeric character data blocks in single or multiple page format. In the preferred embodiment the microcomputer system further includes a character memory communicating with the CPU by way of system address and data lines for storing the character data blocks as they are recovered by the data recovery circuit. A CRT controller circuit means accesses the data stored in the character memory to generate CRT control signals for producing a display of the stored character data. A switch means is provided and operates under software command from the CPU to selectively switch input signals into the video monitor from the video playback device and the CRT controller circuit means.

Preferably, at least some of the data dumps which include alphanumeric character data blocks also include a control word data block and the microcomputer system further includes control word memory communicating with the CPU by way of system address and data buses for storing the control word data blocks as they are recovered by the data recovery circuit. The system further includes color inverting and blanking logic circuit means responsive to the stored control words and commands received from the CPU by way of one of the programmable input/output devices to provide control signals to the CRT controller circuit means for blanking or color inverting selected portions of the alphanumeric characters to be displayed on the video monitor.

In the method of producing a user interactive video display in accordance with the present invention using the abovedescribed system and using recorded video information stored serially in a video storage medium, with the video information including data dumps interspersed with video display segments, the following basic steps are performed: The video playback means is operated to produce a video output from the recorded video information. The data in the data dumps are recovered as they are encountered in the video output produced by the video playback means. The data recovered is then stored to provide operating instructions for the computer while, simultaneously, at least a portion of the data stored from previously encountered data dumps is cleared from storage. Different portions of the recorded video information are then automatically accessed by the computer means in response to user input and the operating instructions provided by the data recovered and stored.

One of the principal advantages of the interactive video display system of this invention is that random access is provided to data dumps and associated live video display segments on the prerecorded medium under positive microcomputer control. This is achieved by including in each of the data dumps medium location information and providing in software routines in selected data dumps branching instructions which, together with instructions for interpreting user input commands, enable a direct fast forward or reverse search of the medium to a new location utilizing the control signal output pulses from the video playback devices as a guide to the medium distance scanned compared to the displacement between the original medium location and the new medium location.

Another important advantage of the system of this invention is the reduction of program software memory requirements since program software routines provided in various data dumps on the prerecorded medium timeshare a small scratch pad memory which is updated as program control is passed from one stored software routine in one data dump to another software routine in a different data dump encountered on the prerecorded medium.

Another advantage of this invention is the provision of full page alphanumeric data blocks within some of the data dumps together with corresponding control signal blocks. By storing this alphanumeric character and control signal data in a timeshared memory and providing a CRT control circuit together with color inverting and blanking logic, sophisticated test and problem solving routines can be implemented utilizing the flexible, interactive branching routines which the system provides.

A more complete understanding of the above-identified objects, features and advantages of this invention will be apparent from the detailed description below of a preferred embodiment.

FIGS. 7-10 are diagrams of a preferred format for data dumps.

Figure 1:
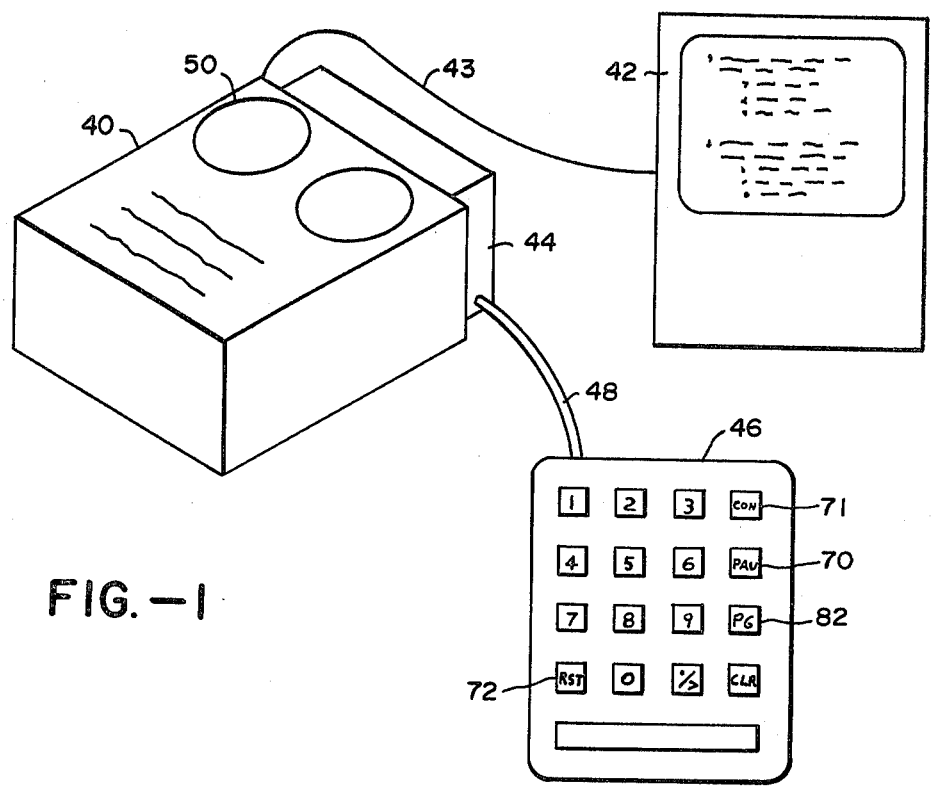
FIG. 1 is a diagrammatic representation of a video tape recorder and CRT monitor modified to include an interactive video system in accordance with the present invention.

The present invention is used in conjunction with a video playback device such as the video tape recorder (VTR) 40 shown in FIG. 1. The VTR unit chosen should incorporate solenoid-type operational controls to permit totally remote-controlled operation. Examples of commercially available video tape players which are suitable for use with the present invention include the Model PV-1600 half-inch video tape recorder, manufactured by Panasonic. Throughout the following description, the letters VTR will be used to identify a video playback device which outputs signals for producing images on a video monitor (CRT). An ordinary color television set can be used for CRT 42, with connection via line 43 being made to the antenna terminals. Alternatively, a color monitor can be used.

Modifications to a standard VTR 40 to adapt it for use with the present invention include the addition of a small add-on enclosure 44 for housing the electronics of the system. A hand-held keyboard control 46 connected by an umbilical cable 48 is used for inputting various commands and responses to the system. Preferably, the system electronics 44 will be coupled directly to the solenoid control and input/output interfaces of VTR 40. The remote control unit for the VTR will not be used. It is intended that when a VTR unit is equipped for use with the present invention, the original functions of the VTR will not be disabled. Modified as shown, the VTR 40 remains capable of recording video signals from a television and playing prerecorded tapes using the manual controls built into the unit. The change between interactive teaching functions and normal VTR functions can be accomplished by unplugging umbilical 48.

The present invention employs the hardware illustrated in FIG. 1 to provide an interactive video system which controls the display of recorded video information while interacting with the user through the use of keyboard 46. A primary intended use for the system is as a teaching machine. Basically, the system is operated by installing a prerecorded instructional tape 50 on VTR 40. The tape will include both recorded video display material, such as graphical information, animation, or any other presentation which might be conveniently provided in a video format. The video display portions will include sound and be in full color. Interspersed with the video display material are a number of data dumps containing programming data used by the system in controlling the video display produced. The data dumps might contain, for example, commands to stop the tape and display certain alphanumeric information such as multiple choice questions, to which the user responds. Depending on the answer received, the system will then command the VTR to advance or rewind the tape to a new location, or continue as before. Textual material may also be presented on the screen between live video displays, with the user selecting the "page" of text by means of keyboard control 46. Instructional tapes for use with the system must be specifically prepared and will ordinarily be purchased prerecorded. The present invention is not intended for use in preparing the prerecorded tapes.

Figure 2:
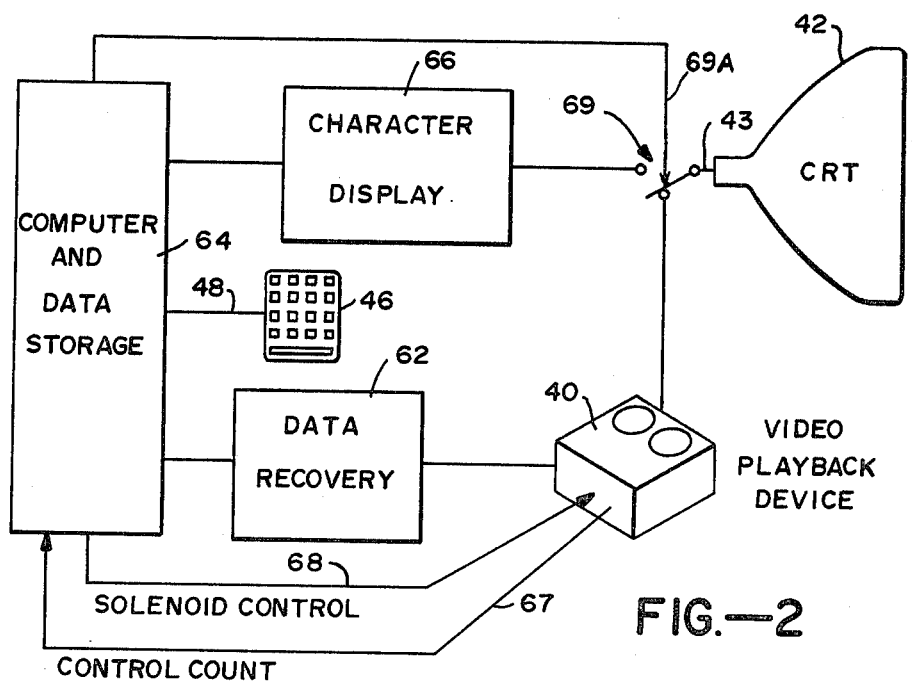
FIG. 2 is a block diagram of an interactive video system for controlling a video playback device in accordance with the present invention.

A general block diagram of the system electronics is illustrated in FIG. 2. The basic components of the system include VTR 40, CRT 42 and keyboard control 46, all shown in FIG. 1. Additional basic components include electronics 62, termed data recovery circuitry, for retrieving data from the data dumps in the prerecorded program, a computer 64, which uses the data recovered in the data recovery circuitry 62, and character display electronics 66.

A solenoid control signal bus 68 is provided between computer 64 and VTR 40 to operate the VTR. The VTR supplies control count signals to the computer over line 67 to permit computer monitoring of the tape position. An output selector switch 69 controlled by computer 64 switches between the output of the character display circuitry, when textual material is to be displayed, and VTR 40, when taped video segments are to be displayed. A more detailed description of the circuitry of FIG. 2 will be provided below.

Figure 3:
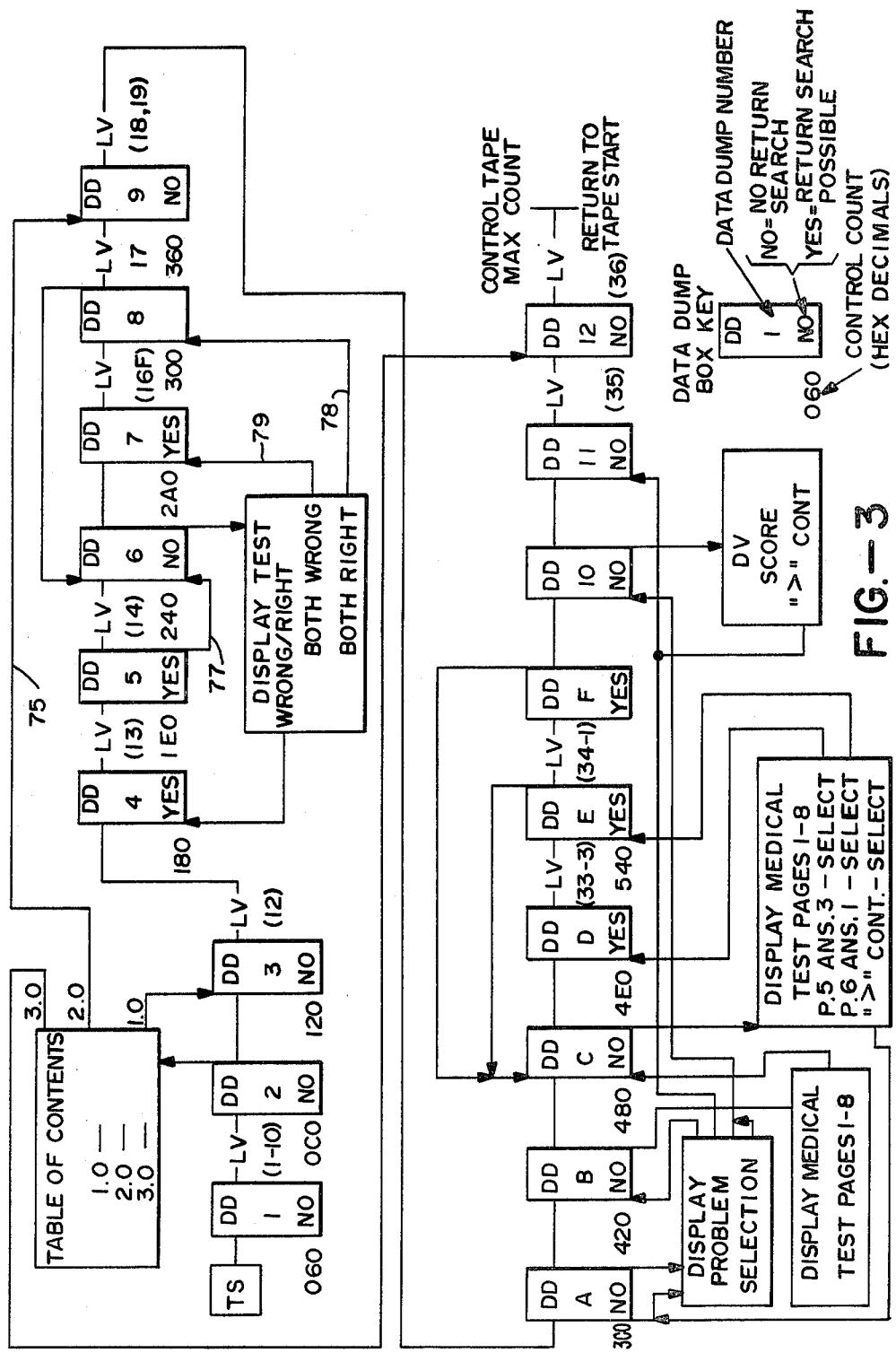
FIG. 3 is a representation of a prerecorded video instructional program for use with the interactive video system of FIG. 2.

The basic operation of the system is best described in conjunction with the playing of a typical educational tape program prerecorded to operate with the present invention. FIG. 3 is a diagram showing the program layout of a demonstrational program tape. The program provides an example of the type and variety of displays which can be provided with the system, and illustrates the manner in which the user interacts with the system as the program is played. The operation of the components shown in FIG. 2 will be described concurrently with the discussion of highlight features of the program diagrammed in FIG. 3.

After loading a prerecorded tape containing the program of FIG. 3 on the VTR 40, the tape will begin to run while displaying a message contained in the memory of computer 64; for example, "Video Education presents . . . ." Referring to FIG. 3, the data dumps on the tape are depicted as rectangular boxes having identifying numbers. Each data dump contains encoded data which is recovered by data recovery circuitry 62. Some data dumps are followed by an "LV" segment, indicating that a segment of live video display is recorded on the tape. It should be understood that FIG. 3 shows the format of the recording on the tape, but that the program is not necessarily played in the order it is recorded since some data dumps will instruct the computer to run VTR 40 forward or back to other data dumps on the tape. In the program of FIG. 3, data dump 1 enables keyboard entry commands for computer 64, including instructions for the action to take when pause key 70 or restart key 72 on keyboard 46 are depressed by the user. If restart is depressed, for example, the computer will rewind VTR 40 and display a message "restart in progress." Data dump 1 instructs the computer to continue playing the tape through the first live video display segment, designated 1-10 in FIG. 3. In discussing the live video segments, the live video reference numbers appearing in boxes beneath "LV" will be used for identification.

After proceeding through live video 1-10, the VTR will encounter data dump 2. As before, data recovery circuit 62 will decode the data dump. Data dump 2 contains a video character display entitled "Table of Contents." Such character displays are loaded into character display circuit 66 by computer 64. While displaying the "Table of Contents," CRT 42 is connected to the output of the character display circuitry 66 by switch 69; and the VTR 40 is stopped by computer 64.

The table of contents in the system demonstration tape contains a choice of three possible programs. Selection is made by the user pressing the desired numerical entry, for example 1.0. Preferably, the "CONT" key 71 must be depressed after the number to avoid mistaken entries. The program selected will determine whether the computer advances the tape to next. For example, if 2.0 is chosen, the tape will be advanced to data dump 9, as indicated by line 75. Should 2.0 be chosen, computer 64 will put VTR 40 in the "fast forward" mode while displaying the message "search in progress" on the CRT screen. Data dump 2 provides data identifying the maximum tape control count for the tape being played, and also control counts or storage location information for each of the three data dumps associated with the start of each item selection in the table of contents. This information is retained in memory to allow future access to each item in the table of contents at any time. As noted above the control count numbers are used by the computer to locate data dumps. Each data dump in the program which includes instructions to move the tape to a new location also includes the control count number for the data dump associated with the new location. This allows the computer to address any data dump, as required. In FIG. 3, the control count numbers are noted at the outside lower left of each data dump box (written in hexadecimals).

Assuming the user selects entry 1.0 from the table of contents, the tape will continue to data dump 3. In the demonstration tape, Program One (entry 1.0) is entitled "Informed Consent." The informed consent program is designed to provide information to patients about treatments they will undergo, and asks specific questions to determine that the patient fully understands the presentation. Following data dump 3, a live video presentation (No. 12) will be presented on the screen directly from VTR 40. Data dump 4 will then be encountered, after which another live video presentation (No. 13) will be given. The designations "yes" and "no" at the bottom of the data dump rectangles indicate whether a return search from another part of the program to that data dump is possible. Data dump 4 includes a "yes" at the bottom, which indicates that at some point a command may be given to return to data dump 4 for a repeat of live video display No. 13. Data dump 5 contains a command to bypass live video display No. 14 after a repeat showing of live video display No. 13, as indicated by arrow 77 in FIG. 3. Live video display No. 14 will not be shown if a return search to data dump 4 occurs. Instead, computer 64 will fast forward VTR 40 to data dump 6.

Data dump 6 includes a character display which causes the circuitry in box 66 to display two multiple choice questions on the screen. The user will answer both questions through appropriate entries in the keyboard control, and his answers will determine where the tape will proceed to next. If, for example, both answers are correct, the tape will be advanced to data dump 8, as shown by line 78. If both answers are incorrect, the tape will proceed to data dump 7, as indicated by line 79. If one answer is wrong and one is correct, the tape will return to data dump 4 where live video display number 13 will be repeated and live video display No. 14 will be bypassed for the first time. Data dump 7, which is accessed after two incorrect answers, will be followed by live video display 16F, and after data dump 8, the tape will be rewound to data dump 6, where the display test will be repeated. When the user eventually enters the correct answer to both questions the tape will proceed to data dump 8 and play live video display No. 17 which concludes the "informed consent" program.

Following the "informed consent" program, the tape contains Program Two, beginning with data dump 9, entitled "Patient Management Program." Briefly described, the patient management program instructs the user in the treatment of various symptoms. After a program introduction in the form of live video display Nos. 18 and 19, data dump A produces a character display setting up a number of possible treatment situations which may be selected. Hospitalization, tests, and other treatments are among the choices offered. Data dumps B and C provide sixteen "pages" of information identifying diagnostic tests to choose from, for example blood tests, urine test, X-rays, etc. The charcter display circuitry 66 in FIG. 2 will accommodate up to eight pages of character display from a single data dump. In the illustrated program, the user will first display selected pages from data dump B, using the page key 82 as the keyboard control, and then advance to data dump C. Certain choices in the display of data dump C will cause transfer to other data dumps. For example, the selection of answer 3 on page 5 will advance the tape to data dump D, which is followed by a live video display dealing with X-ray testing. Answer 1 on page 6 will advance the tape to data dump E, which is followed by a live video display dealing with EKG tests. Depressing "7 CONT" during the live video display following data dumps D or E will return the user to the page from which the selection of the live video was made. Depressing "7 CONT" at any other time during the eight page display of data dump C will return the user to the original problem display following data dump A. The "Patient Management Program" (Program Two) is concluded by proceeding to data dump 10, where a user score is given, and a choice is offered to return to the display of data dump A or to go to a concluding live video display (No. 35) following data dump 11.

The last item on the tape is a live video display (No. 36) following data dump 12. In the demonstration tape a final message is provided. Data dump 12 also constitutes the third program in the table of contents, which can be selected by the user if desired. Following the conclusion of the live video display, the VTR encounters an "end" signal which rewinds the tape to the beginning.

The above-described tape program illustrates the flexibility of the present invention in presenting program material which is interactive with the user. The teaching program provides images on the screen in full color. At certain times, the video display will be interrupted by the appearance on the screen of questions and multiple choice answers. The user will respond to the questions by pressing appropriate keys on the keyboard 46. Depending on the answer given, the system will move the tape to a new location where an additional presentation will be made on the screen. Up to eight pages of character display can be accessed instantly by the user, and any additional number of pages can also be provided when the tape is allowed to proceed to other data dumps. Instructional material can be repeated if an incorrect answer is given to a question, and remedial instruction can be provided for. Although the illustrative tape outlined in FIG. 3 has only three program entries in the table of contents, a far larger number can be provided. The prototype hardware will accommodate up to 72 separate programs on a single tape, for example.

Figure 4:
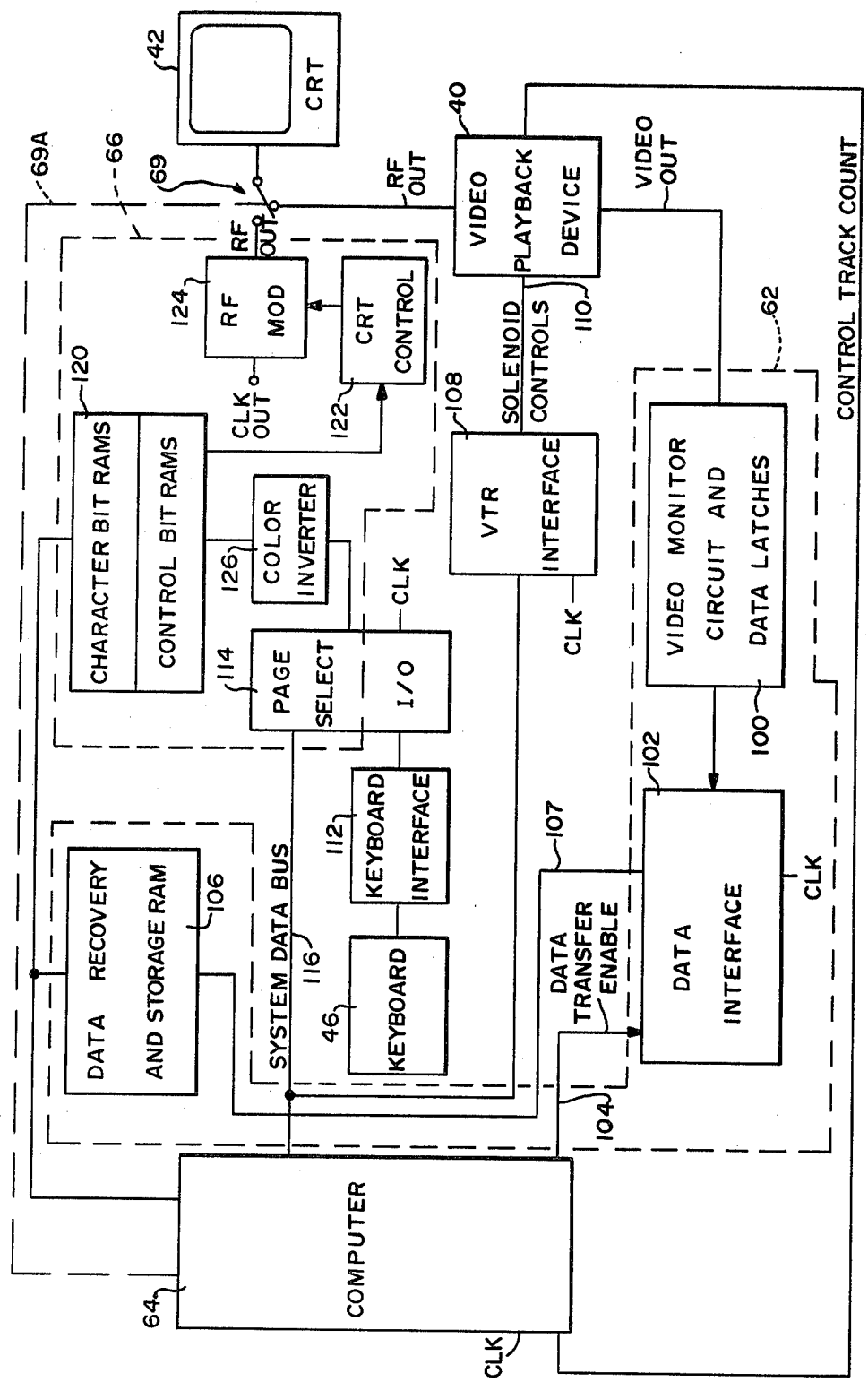
FIG. 4 is a schematic block diagram illustrating the circuitry of the interactive video system shown in FIG. 2.

The circuitry outlined generally in FIG. 2, which allows the present invention to control the display of recorded video information by means of a video playback device, is shown in greater detail in FIG. 4. The system of the present invention is used with a video playback device such as VTR 40, which is capable of producing a video output from recorded video information. Both data dumps and live video display are included in the recorded video information. The video playback device must be capable of accessing portions of the recorded video information. For example, the VRT 40 must be able to fast forward and rewind tape to specific locations. Connected to receive the video output of the video playback device is a data retrieval system for retrieving the data from data dumps in the recorded video information. Numerous well known techniques are available for recording and recover-digital information on magnetic tapes or the like. Such well-known techniques as biphase data storage can be used for this purpose, for example. The circuitry of the illustrative embodiment described herein is not dependent on the type of data storage and retrieval format used, although a preferred system is disclosed in a co-pending patent application entitled "System for Formatting Data on Video Tape for High Accuracy Recovery", invented by Nicholas Cerracchio, bearing application Ser. No. 192,226, filed Sept. 30, 1980, and assigned to the same assignee as the present application.

Box 100 represents a video signal monitoring circuit together with preliminary data retrieval circuitry for the system. In general, the circuitry in Box 100 will monitor the video output signal from playback device 40 until a signal is detected indicating that a data dump is immediately to follow. In the preferred embodiment, a tone having a predetermined frequency and duration is used to indicate a data dump. Comparator circuitry in Box 100 detects the tone and computer 64 checks its duration. When an impending data transfer is indicated, the computer enables data recovery circuitry, which in conventional biphase data recovery inclues shift registers and associated latch devices. The data bits are then transferred to a data interface I/O device 102. Computer 64 signals data interface 102 over line 104 to transfer the data via line 107 to data storage RAM 106, which serves as an erasable memory for computer 64. In the illustrated embodiment RAM 106 will have a storage capacity of 4K×8. The video monitor circuitry 100, data interface 102 and data recovery and storage RAM 106 together form the data recovery circuitry identified in FIG. 2 as Box 62.

Computer 64 includes a type Z-80A microprocessor together with other peripheral elements such as permanent memory units containing basic program instructions and the like. The computer accesses data in RAM 106 and also receives instructions from the keyboard control. Connected to video playback device 40 is an I/O interface 108 which provides signals to the various solenoid controls over line 110. Through interface 108, computer 64 is able to play, stop, rewind and fast forward VRT 40. The control keyboard 46 is connected to computer 64 through a buffer 112 and an I/O device 114, identified as "page select" due to another function it performs. The keyboard control signals then pass into the system data bus 116, tied to the computer. As noted above in the description of the program outlined in FIG. 3, keyboard control 46 provides certain numerical and direct command inputs into computer 64. The keyboard inputs are used in conjunction with the data recovered from the data dumps to cause the computer to access specific portions of the recorded video information. Preferably, the system will be able to fully disconnected from the VTR when the keyboard umbilical is unplugged, allowing the VTR to perform other tasks.

In those instances where a data dump includes character display information for producing textual matter or test questions and answers, the data dumps will contain specific address information which causes the computer to transfer the character display information to a plurality of character display RAMs 120. Character display RAMs 120, which in the preferred embodiment are twelve 4K×1 RAMs, together have the capacity of storing eight pages of characters containing 512 characters per page. The RAMs include six 4044 RAMs for storing character words and six 4044 RAMs for storing control words associated with each character word. The characters are stored in standard ASCII format, read by a conventional CRT control circuit 122 for output to the CRT 42 through an RF modulator 124.

In the illustrative embodiment, the characters are displayed in a format of 32 characters per line, with no more than 16 lines per page, for a maximum of 512 characters per page. The page displayed is selected directly by keyboard entry from keyboard 46 and interface 112 through the page select I/O buffer 114. A color invert control circuit 126 connected to the control word RAMs controls color inversion for each character. The control words associated with each character word determine whether the character is blanked or not. This feature is used in the display of test questions, where an answer may be stored in the character display RAMs 120, but is blank until the user makes a selection. Similarly, color inversion may be used for a character or line of characters to indicate that the particular selection has been made by the user. An example of the latter is in the selection of the program from the table of contents. The user will first enter a number for the desired program, which is then color inverted. In that way it is possible for the user to determine if a selection error was made.

Finally, the computer 64 determines which RF modulated output is sent to the CRT 42. During live video display portions of the program, the RF output of the video playback device 40 is connected to the CRT. During the character display segments, when the video playback device is stopped by the computer, the CRT is connected to the RF output of the character display circuitry 66, which generally encompasses the character display RAMs and CRT control circuitry, plus modulator 124.

Figure 5:
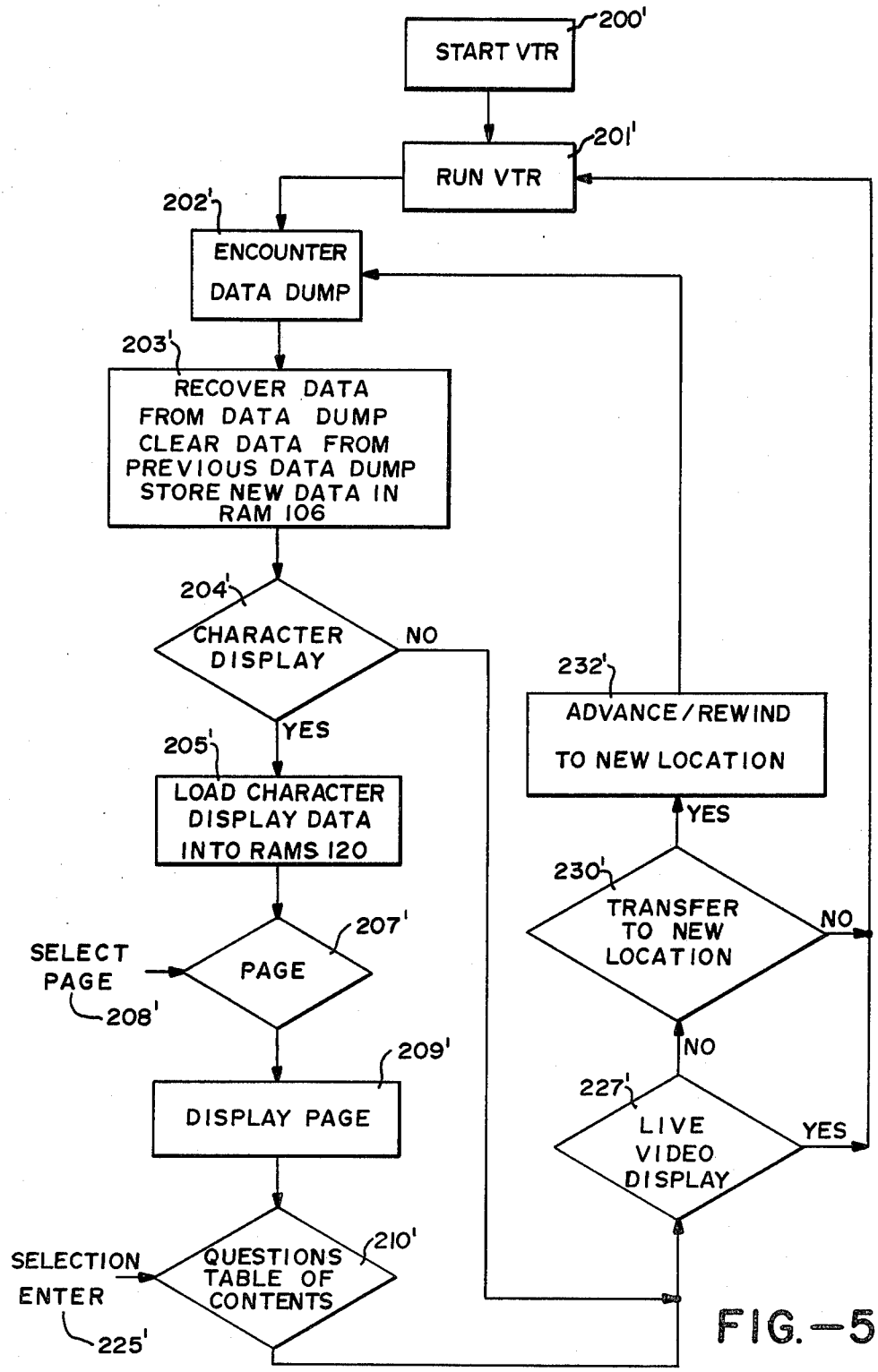
FIG. 5 is a flow diagram illustrating steps in the operation of the computer shown in FIGS. 2 and 4.

The method of producing a user interactive video display in accordance with the present invention using the circuitry of FIG. 4 is outlined in the flow diagram of FIG. 5. Steps in the method include first setting up and operating the video playback machine such as VTR 40 to produce a video output from recorded video information on a tape or the like (box 200'). The video output may be either data dumps or live video displays. The playback device will then run (Box 201') until a data dump is encountered, at 202'. The next step is the recovery of data from the data dumps, at 203'. Recovery of the data includes storing the data from the data dump in RAM 106 and also simultaneously clearing at least a portion of the data from the previously encountered data dumps from RAM 106.

If character display information is encountered (204') in the data dump, additional steps are performed including loading the character display information into the character display RAMs 120, at 205', and stopping the video playback means. If a page selection is required, at 207', a keyboard entry is made at 208'. The selected page is then displayed, at 209'. If the character display information contains questions to be answered by the user, an additional step 210' is performed by the user as the system waits for the answer to be input by the user at 225'. If no questions are asked, the user enters a continue command and the method proceeds to a live video display at 227'.

Finally, the step of automatically accessing different portions of the recorded video information is performed by the computer, at 230'. The step is accomplished using solenoid control signals in conjunction with positional information acquired by means of the control track count monitored by the computer. The decision to transfer and the transfer location are dependent on the data recovered at 203' and the user entry 225'. If the tape is not to be advanced or rewound, the VTR continues to run. If a new portion of tape is to be accessed, signals are transmitted by the computer to the VTR, advancing or rewinding the tape, at 232'. The new position will preferably be at a data dump, where the above process is repeated.

One important feature of the present invention is the need for only limited memory. Virtually all data used in the control and operation of the system is stored permanently on the prerecorded tape or other video recording medium. RAM 106 and character display RAMs 120 need only be large enough to store data from a limited number of the data dumps on any tape. This is because as each new data dump is accessed by the system, most the data previously stored in the RAMs is cleared. Data from some of the data dumps, particularly keyboard entry enable commands and the like, are stored in protected locations within RAM 106 and are not erased by subsequent data dumps. The feature of having only a limited amount of random access storage distinguishes the present invention from computer controlled teaching machines, which generally have large memories. Since the method of operation of the system, as controlled by computer 64, is the same for each data dump, the amount of preprogrammed memory required is relatively small, yet the system provides great flexibility. With the storage of new data, the system is effectively reprogrammed. The fact that the system has great flexibility in potential responses to user input despite limited memory is illustrated by the variety of operations provided for in the program outlined in FIG. 3.

Figure 6:
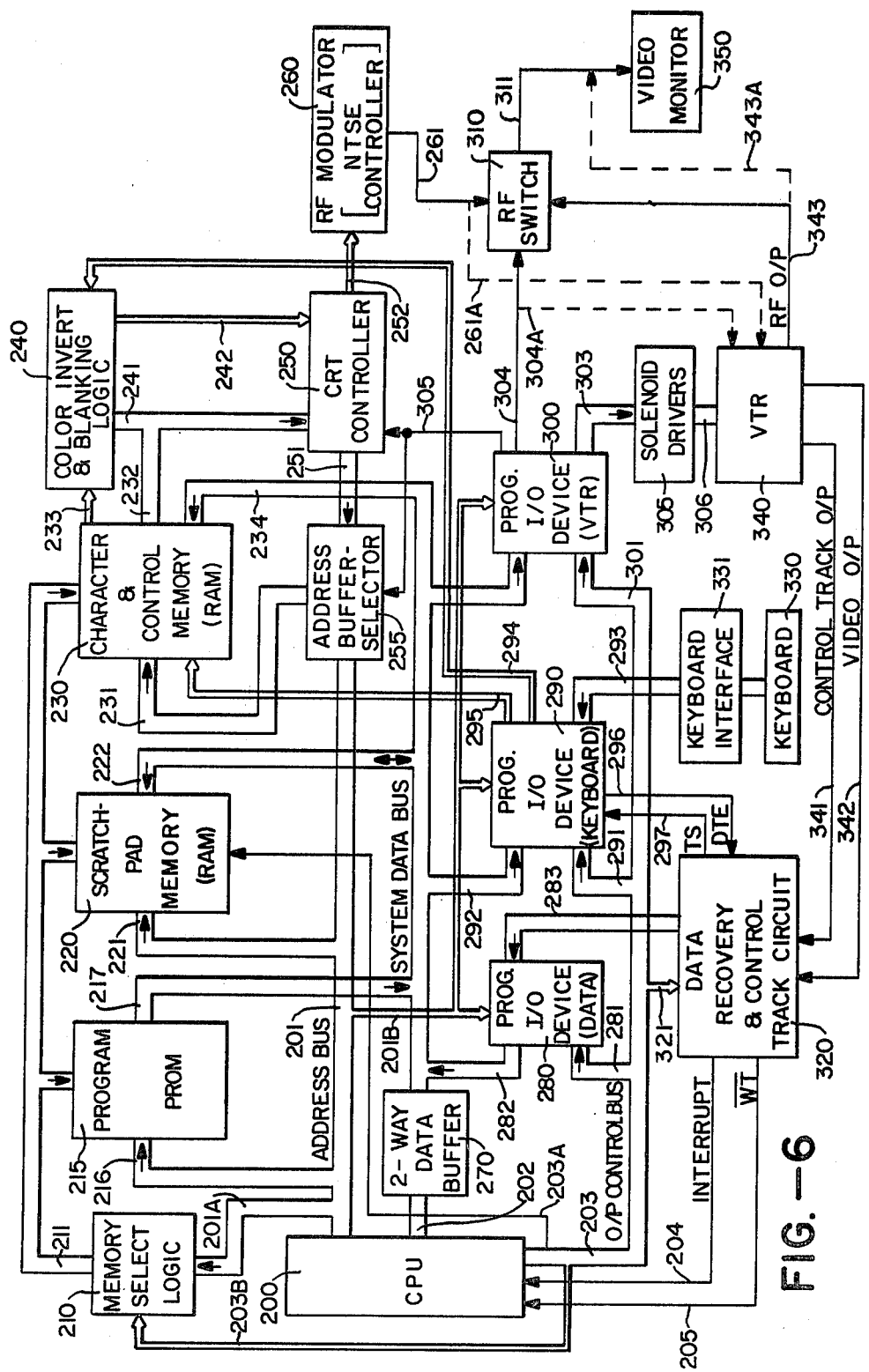
FIG. 6 is a schematic block diagram of a preferred embodiment of an interactive video display system in accordance with this invention.

Referring now to FIG. 6, a more detailed block schematic diagram of a preferred embodiment of an interactive video display system in accordance with this invention will be described. As shown in FIG. 6 the basic components of the interactive video display system are a video playback device such as video tape recorder (VTR) 340, a video monitor 350, a user input keyboard 330, and a microcomputer system consisting of a central processing unit (CPU) 200 (preferably a microprocessor), and associated memory devices such as program PROM 215, scratch pad memory 220, character and control memory 230, and a plurality of programmable input/output (I/O) devices 280, 290, and 300. The microcomputer system further includes a data recovery and control track circuit 320 and character generation circuitry involving CRT controller 250, color inverting and blanking logic 240 and RF modulator 260. A system clock (not shown) will be provided to drive RF modulator 260 and other clocked circuits within the system.

Generally, the architecture of the microcomputer system including the various memory devices and programmable I/O devices and the signal communication channels between these devices and CPU 200 is a relatively standard microcomputer architecture. A system address bus 201 communicates between CPU 200 and program PROM 215, scratch pad memory 220, and character and control memory 230 to address memory locations in these devices for reading data and in some cases, reading and writing operations. During a memory read operation data is fetched from a particular memory location in one of the memory devices and placed on system data bus 202. Some of the addresses on address bus 201 are communicated via an auxilliary bus 201A to memory select logic 210 which provides selection signals over bus 211 to control which of the memory devices is addressed by the CPU at any particular time. Program PROM 215 is a read only memory device and is accessed to read program control information into CPU 200. Program PROM 215 contains the basic operating program for the microcomputer system and enables the system to perform the general data processing and control functions for the specialized application of this invention.

Scratch pad memory 220 is a random access read/write memory whose read/write operating mode is controlled by control line 203A from system control bus 203. In the read mode, address signals from address bus 201 cause data stored in address memory locations to be output to system data bus 202. In the write mode, data presented on system data bus 202 is written into memory locations selected by address information on address bus 201. Similarly, character and control memory RAM 230 is a random access read/write memory. In this case the memory select logic 210 also provides control signals to determine the operating mode of character control memory RAM 230 using selected control inputs from control bus 203 supplied on bus 203B.

Each of the programmable I/O devices 280, 290, and 300 communicate with the output control bus 203 over respective input bus segments 281, 291, and 301. Each of the I/O devices 280, 290, and 300 also communicate with system data bus 202 via respective bus segments 282, 292, and 302. Some address bits from address bus 201 are supplied via bus 201B to each of the I/O devices as part of the control of their operation in the system.

I/O device 280 is interfaced to data recovery and control track circuit 320 by way of a bus 283. As will later be seen, the I/O device 280 is devoted to communicating data recovered from the video output signal of VTR 340 onto system data bus 202 for processing by the microcomputer system. I/O device 290 is interfaced via a bus 293 to a keyboard interface 331 which in turn is coupled to a keyboard 330. Keyboard 330 is for this embodiment, the keyboard configuration 46 depicted in FIG. 1. The principal function of I/O device 290 is to communicate user input control signals from keyboard 330 into the microcomputer system. I/O device 290 also functions to communicate, under CPU control, certain page selection address information via bus 295 to character and control memory 230. In addition, I/O device 290 functions under CPU control to communicate control information via bus 294 to color invert and blanking logic 240. An additional function of I/O device 290 is to communicate certain control signals between data recovery and control track circuit 320 and CPU 200 via control lines 296 and 297.

I/O device 300 has the principal function of sending control command signals under CPU control via bus 303 to solenoid drivers 305 which in turn provide solenoid drive signals over bus 306 to operate control function solenoids in VTR 340. I/O device 300 also functions under CPU control to send control signals over control line 304 to RF switch 310 to switch the display on video monitor 350 between signals from the character generation circuitry and the RF video signal from VTR 340. Another function of I/O device 300 is to communicate control signal information via control line 305 to CRT controller 250 and to address buffer selector 255 which determines whether character and control memory 230 is addressed by CPU 200 over system address bus 201 or by CRT controller 250 over address bus 251.

CRT controller 250 is a standard control circuit which addresses sequential locations of data storage in character and control memory 230 over address bus 251 and translates the data words stored in sequential memory locations communicated into CRT controller over data bus 232 to output signals 252 which, when formatted and modulated, can be utilized to display alphanumeric information in a multiline fashion on video monitor 350. As CRT controller 250 is reading alphanumeric character data words out of character and control memory 230 simultaneously control words are read out on bus 233 and provided to a color invert and blanking logic circuit 240. The control words are utilized by color invert and blanking logic circuit 240 together with control signals supplied over bus 294 to determine whether a particular alphanumeric character will be inverted in color or blanked on the video monitor. The output of CRT controller on signal bus 252 may be modulated in RF modulator circuit 260 for communicating to a RF switch over bus 261. Alternatively the CRT controller output signals on lead 252 may be processed into a standard video format by operating the circuitry of block 260 as an NTSC controller. The output video signal on lead 261 would then be communicated via an alternate signal channel 261A into VTR 340 to a switching arrangement which controls whether the video signal recovered from the video tape or the video signal corresponding to alphanumeric information is coupled into the RF modulator within VTR 340. Switch control line 304A is shown coupled into VTR as the switching control input signal which determines whether the video signal corresponding to alphanumeric data or the live video recovered from the tape played on the VTR is supplied to the RF modulator and then supplied on output line 343A directly into video monitor 350. In this alternate embodiment RF switch 310 is eliminated.

Data recovery and control track circuit 320 performs a combined function of recovering data from video output signals on signal line 342 coming from VTR 340 and providing interrupt signals responsive to control track output signals on signal line 341 when VTR is placed in a fast forward or reverse scan mode and where the VTR is playing live video segments on the prerecorded tape. The purpose and specific operation of this circuit within the system of this invention will become apparent from the discussion below of the response of the system to a particular prerecorded program in conjunction with the exemplary program depicted in FIG. 3 and generally discussed above.

As discussed above, the operation of the microcomputer system in providing interactive control of the program content provided on a program tape to be played on VTR 340 is highly dependent on accurately recovering software program information in data dumps on the prerecorded tape. It is well known that the normal recording and playback operation of live video signals on a video tape recorder does not require a high quality magnetic tape medium such as is generally utilized in data tapes for computer systems. Video recording and playback can tolerate tape defects in the form of scratches in the tape coating without seriously affecting the overall image quality of the live video display. However, tape defects which either wipe out or alter recorded data information on the tape will cause a serious malfunction of the microcomputer-based video display system of this invention if important software program data is obliterated or garbled.

FIGS. 7–10 illustrate a preferred data format for data dumps on prerecorded program tape which enable high accuracy data recovery even with normal VTR tape defects. As shown in FIG. 7, the general overall format of the prerecorded program is a live video segment which terminates with a number of fields of recorded tone which indicate that a data dump is to follow. Following the fields of recorded tone a plurality of data segments are recorded, each being recorded between successive vertical sync pulses. FIG. 8 shows the data format of the data segments between successive vertical sync pulses. As shown, three redundant blocks of data words are recorded between successive vertical sync pulses. Each of the redundant data blocks is preceded by a set of three redundant sync words and the third redundant data block is followed by a fourth set of redundant sync words. The first, second, and third sync words identify the succeeding data block as the first, second, or third one of such redundant blocks.

FIG. 9 shows the format of recording the sets of three redundant sync words. As shown, individual sync words are separated by six blank horizontal sync intervals followed by a few blank intervals between the third sync word and the first data word in the first block of forty-five data words. Similar spacing between sync words in the second, third, and fourth sets of redundant sync words are also provided.

The formatting of data in this fashion on the prerecorded program tape is utilized to insure accurate data recovery in terms of the typical parameters of tape defects expected to be encountered on a video tape medium. By recording three redundant blocks of data words, localized tape defects will generally obliterate or introduce errors into some of the data words in only one of the redundant blocks thereof. Validation of data can therefore be readily achieved by performing a two out of three compare of the data words in the three redundant blocks. In other words, if two of the three redundant data words agree, then the data bits in that word are validated as accurate data. If redundancy were provided in data blocks in successive intervals between vertical sync pulses, a lengthwise scratch in the tape would affect the same data words in each block and a two-out-of-three compare would not produce valid data. Similarly, blank intervals between the redundant sync words are provided on the basis of a determination that the maximum expected tape defect will have a width such that at most one of the sync words will be obliterated or altered. A corresponding two-out-of-three compare of the three recovered sync words can then be utilized to validate the recovered data. The number of data words or bytes per block of data in the three redundant blocks is generally determined by the signal bandwidth of the video tape recorder and the tape medium.

As shown in FIG. 10, the format of the actual data words comprises modulated data signals recorded between successive horizontal sync pulses. In this case ten bits of data are recorded between each horizontal sync pulse with the first two data bits used to differentiate sync words from data words.

In practice, the data recording format disclosed in FIGS. 7 to 9 has proven to provide very accurate recovery of data recorded on standard VTR tape media such that accurate programming of the interactive video display system of this invention with software program instructions prerecorded on the video tape medium in data dump segments provides a satisfactory software program routine input to the microcomputer system utilized in the video display system.

Referring back now to FIG. 3 of the drawings, the overall operation of the video display system of this invention depicted in FIG. 6 may be described. As the program tape containing the prerecorded control program illustrated in FIG. 3 is played on VTR 340, the first information encountered on the tape is a data dump which would be preceded by nine fields of recorded tone signal as depicted in FIG. 7. For initial play of the prerecorded tape, the CPU will provide instructions via I/O device 300 to solenoid drivers 305 to play VTR 340 in the play mode. Data recovery and control track circuit 320 includes a tone detector which detects the recorded tone signals and sends a tone signal on control line 297 labeled TS to I/O device 290. I/O device 290 is active during this time and communicates the presence of the tone signal to CPU 200 which validates the tone signal as being of sufficient duration and continuity and then returns a control signal (DTE) on control line 296 through I/O device 290 which enables the data recovery circuit in data recovery and control track circuit 320. With the data recovery circuit enabled successive data words between horizontal sync pulse intervals are recovered in the data recovery circuit and transmitted as successive ten-bit bytes to I/O device 280. The data recovery circuitry provides an interrupt signal on control line 204 to CPU after recovering each ten-bit byte of data. CPU 200 then functions under program control to accept the data byte by way of I/O device 280 onto system data bus 202 and stores the data byte in scratch pad memory 220. After each data byte has been received and stored, CPU 200 generates an interrupt acknowledge over control lines 321 to data recovery circuit enabling the data recovery circuit to recover the next data word and send it to I/O device 280. This data recovery operation continues until all of a particular data segment between vertical sync pulses has been recovered and recorded in scratch pad memory 220. The fourth set of three redundant sync words at the end of each data segment signals the CPU that a data segment has ended, whereupon the CPU initiates a program routine which quickly validates the data recovered in that data segment (using a two-out-of-three compare) and stores it in an assigned location in scratch pad memory 220 or in character and control memory 230 depending on whether the data bytes recovered constitute software control words or alphanumeric text or control words for alphanumeric text. The particular form of the data recovery circuit depends upon the data modulation scheme employed and any one of a number of standard schemes are available. A preferred form of data recovery circuit is disclosed in the above-referenced co-pending Cerracchio patent application and is hereby incorporated by reference herein.

An important aspect of this invention is the feature which involves continuous monitoring by the CPU 200 in an internal tape position register of the approximate tape position of the prerecorded program tape during all modes of operation of VTR 340 together with an updating of the tape position register with exact tape position information recorded in each data dump as data words from a particular data dump are recovered from the program tape. During play of a live video segment on VTR 340, and during fast forward or reverse scan of the tape on VTR 340, the control track circuit portion of data recovery and control track circuit 320 is monitoring the control track output of VTR 340 on signal line 341 and generating periodic interrupt signals over line 204 to CPU. These periodic interrupt signals are utilized by CPU 200 to update the tape position register within the CPU on a continuous basis. When the system has encountered a data dump and is recovering data, the content of the tape position register within CPU 200 is updated with exact tape position information which is recorded as part of the data in the first segment of each data dump. Thereafter, as additional segments of data between vertical sync pulses for a particular data dump are recovered, an internal software program routine updates the contents of the tape position register within CPU 200 based on the number of data segments contained in the data dump.

In this fashion, the CPU 200 at every instant in time has information either as to the exact tape position or a very good approximation of the tape position. As will be discussed in more detail later, CPU 200 utilizes this continuously updated tape position information together with other information stored in scratch pad memory 220 from a previous data dump or from a currently active data dump to calculate approximately how far to scan in a fast forward or fast reverse scanning mode to locate a new data dump to which the system is either being sent by a user input command or by an automatically instituted search command programmed into a particular data dump. Crucial to the successful implementation of random access to desired data dumps on the prerecorded tape is the provision of accurate tape position information within the data dumps themselves to provide regular updating of the tape position register within CPU 200. This regular updating of the tape position register with exact tape position information avoids the possibility that cumulative errors in the approximate monitoring of tape position by way of control track output signals will build up to a result in which the system actually loses its place on the prerecorded tape and cannot find the particular data dump to which it is being directed.

Referring back to FIG. 3, the first data dump encountered on the tape functions principally to instruct the microcomputer system that a live video segment will follow and thus includes a program control word which signals the CPU 200 to keep VTR 340 in a play mode via a control command through I/O device 300 over bus 303 and signals RF switch 310 over signal line 304 to place video signal outputs from VTR 340 on the input line 311 to video monitor 350. VTR 340 continues to play the prerecorded program tape through the live video segments following data dump number one until data dump number two is encountered, signalled by the presence of the nine fields of recorded tone which are detected and utilized to enable the data recovery circuitry in block 320 as previously described.

The data in the data segments associated with data dump number two are recovered and validated in the same fashion as the data in data dump number one. However, in this instance the data dump is considerably more complex and actually consists of a software program together with one page of alphanumeric text which will be utilized to generate and display the table of contents indicated in FIG. 3. Part of the software program includes branching routines which provide the data dump numbers and position information on data dump locations to which the system may be instructed to search under input from keyboard 330. Accordingly, the software program instructions in data dump two also include instructions for interpreting a set of keyboard commands as operatively selecting one of the branching instructions as the active control instruction for the system. In addition, since text data and corresponding control data is included in data dump two, the software program commands include information as to the number of bytes of text data and control data and directions as to the destination addresses of the text data and control data words.

After the data words in the complete data dump have been recovered and stored in scratch pad memory 220 and character and control memory 230, the software program from the data dump is executed by the system. In executing the software routine, a number of control actions will take place. At the end of the data dump after all data has been recovered and stored, the computer will instruct VTR 340 to stop by way of a command through I/O device 300. One of the control words in the software routine will have indicated that the video control mode associated with the data dump is the character generator mode and accordingly, the CPU will signal the RF switch 310 through I/O device 300 over control line 304 to place the RF signal on line 261 on the input line 311 to video monitor 350. Under program control CPU 200 will then signal CRT controller 250 and address buffer selector 255 over control line 305 through I/O device 300 to initiate an alphanumeric character display function. This will cause a display of the table of contents menu on video monitor 350 and instruct the user to input a control command sequence on keyboard 330 to select one of the programs in the table of contents to which the system will then be directed.

Preferably, when the user inputs the control command sequence for the desired program, the CPU will first respond to the control command input by instructing the color invert and blanking logic circuit 240 to color invert the particular item in the table of contents which the user has selected. This signals the user that that is the selection which he has made. If desired, the user can clear the previously entered selection and enter a new selection which will then be displayed to him in the form of a color inverted portion of the table of contents. As previously indicated, the system is preferably programmed to require the user to enter a continue command after selecting a menu item which will be associated with a particular branching instruction to start the computer system's execution of the selected branching instruction.

For purposes of illustrating the execution of a tape location search routine associated with a particular branching instruction, it will be assumed that the user has selected item 2.0 on the table of contents menu and thus selected a branching routine which will cause a video tape search for data dump number nine. As previously mentioned, part of the branching routine program previously stored in scratch pad memory is the data dump number associated with control command sequence 2.0 and the position information for that data dump. In executing the branching routine, the computer knows its current tape location at the end of the particular data dump containing the branching routine because of the updating of the tape position register, first by the tape position information in the first data segment of the data dump and then by a software routine as additional data segments are recovered as described above. As part of the software control program, the computer has been informed of the tape position location of the new data dump to which it is being directed. From this information the computer calculates a number of anticipated interrupt signals which it anticipates will be encountered in scanning to the new location and subtracts a preset number therefrom in order to determine a search stopping point at a predetermined position in front of the data dump to which the system has been directed to scan. Preferably an adaptive search routine is utilized in the software so that the preset number subtracted is increased in magnitude as the distance to be scanned increases to ensure that the search stopping point will be in front of the desired data dump.

Having calculated the tape position displacement between the current position of the tape and the position of the data dump, the computer system sends a fast forward command to VTR 340 through I/O device 300. While in the fast forward mode, VTR 340 outputs control track pulses on control track output 341 which are received by control track circuit in block 320 which counts control track pulses and produces an output interrupt signal after a preselected number of control track pulses are counted. The computer has calculated the displacement in terms of the number of interrupts, and acknowledges each interrupt with an interrupt acknowledge over input 321 to reset the control track counter. The computer maintains VTR 340 in the fast forward mode until it receives the number of interrupts corresponding to the calculated tape position displacement, whereupon CPU 200 signals the VTR to stop and enter a play mode until it encounters the tone signal identification of a following data segment. Thereupon the data recovery from the located data dump begins and the CPU verifies that it has found the desired data dump based on tape position information stored in that particular data dump. The CPU also updates the internal tape position register with the tape position data contained in the data dump as previously described.

Since at this point, program control is to be passed to the program information stored in data dump number nine and, later, to successive data dumps A and B, the program control information in these data dumps will generally overwrite program control information previously stored in scratch pad memory 220 except for any portions of program control data from data dump two which the computer is instructed to remember for later use. Similarly, alphanumeric data words and corresponding control data words which are recovered from data dumps A and B, will overwrite previously stored character data and control data in memory 230.

The program flexibility involved in the overall program segment on the prerecorded tape which begins at data dump nine has been generally discussed above. To more specifically illustrate the overall flexibility of the localized program storage capability of this system, consider the content of data dump A which follows the live video segment played under command by data dump nine. A live video segment has presented a patient examination situation in which the patient's medical history and symptoms and general physical condition have been given. Data dump A contains program software information and text data including seven pages of alphanumeric text. The program software information contains branching instructions and keyboard command interpretation instructions individualized to the various pages of the alphanumeric text. After the program control words, text words and text control words have been recovered from data dump A, the program begins to execute by first displaying a variety of possible responses that the user may make to the situation. The system is programmed to respond to the various selections that the system user enters by way of keyboard commands either to branch to a display of a different page in the seven pages stored in the text memory or to branch to the following data dump A. If the user selects one of the responses which causes display of another page stored from the same data dump, the new page display gives the results of the user's choice and requests further input as to what the user would do next. The system is programmed with respect to each page to respond to a particular set of possible input commands relative to that page either to branch to a different page within the same data dump or to the following data dump A.

Assuming that at some point the user enters the appropriate response which causes branching to data dump A, the VTR 340 will be commanded to play through that data dump while recovering and storing data in the form of program control words and text associated with that particular data dump, updating scratch pad memory 220 and character and control memory 230 with the new program and text information. In the particular program illustrated in FIG. 3, the next data dump which is data dump A, also contains eight pages of text information.

This new active data dump automatically displays the first page of the text which provides a tutorial message and instructs the user as to what pages to go to for selecting various diagnostic tests to be run on the patient. When the user inputs a particular page number and the continue command from the keyboard, the system responds by displaying the selected page and asking the user to enter control commands to select one of the various types of tests indicated on that page. Included in each page display in the character memory are the results of the selected tests on that particular patient, but those test results are blanked using the color invert and blanking logic circuit until the system user inputs a control command indicating he wants that test performed. The system then responds by unblanking the test results and displaying it to the user on the monitor. After the user has selected all of the tests desired to be performed on the patient within this data dump segment and receive the test results for each selected test, the user instructs the system to proceed to the next sequence of possible tests.

These next sequences of possible tests are associated with data dump C which again is input into the system and contains both software program instructions and alphanumeric text and associated control words which are recovered and stored in scratch pad memory 220 and character and control memory 230, respectively.

Again in conjunction with this data dump the user selects the page of tests which he wishes to consider and within each page selects the particular tests to be performed. Selection of some of the tests results in activating branching instructions to other data dumps which control the display of live video segments such as displays of x-rays or electrocardiogram readouts. After these live video segments the computer is instructed to return to the control of the prior data dump.

From the above description it should be apparent that the system of this invention has great flexibility in implementing very sophisticated program branching routines utilizing only a relatively small amount of scratch pad memory and character and control memory. This is accomplished by using localized program control in individual data dumps, each of which updates and at least partly overwrites the scratch pad memory with program control information and the character and control memory with associated alphanumeric text and control words. The system of this invention thus provides the courseware designer with great flexibility in producing educational programs which involve a high degree of user interaction and control of the progress of the particular program through the system. In addition, the system provides for retaining certain control program information in scratch pad memory when branching to a subsequent data dump in order to retain certain information such as scoring routines and scoring input data based on user selections of responses to questions or problem situations throughout a series of individual data dumps associated with a particular learning program.

The present invention provides for user interactive video displays of great variety and responsiveness without the use of large-scale computers. Programming possibilities include the use of live video action displays in full color interspersed with questions, the response to which determine the further course of the program. As such, the invention is an ideal teaching device. Because the system and method is usable with video tape recorders which are suitable for many other useful applications, the invention is highly cost effective, particularly since users of video teaching machines are likely to also have other uses for a video tape recording and playback system. The variety and types of programming subjects which can be taught by the system is unlimited, as is the flexibility with which the programs can be designed. It is relatively easy to provide for changeover from the user interactive mode to the standard VTR mode by simply unplugging the keyboard umbilical from the electronics pack 44 mounted on the VTR. Programs played by the system can easily be made fully self explanatory, eliminating the need to provide any instruction on use of the system. Even the instructions on the proper way to enter answers and numbers through the keyboard control can be included at the beginning of each tape. The electronics used are simple and reliable and the remainder of the hardware has had years of testing in public use, so that the system will be relatively rugged and trouble free. Alternative embodiments are possible within the scope of the present invention. The VTR is not the only type of video playback means suitable for use with the invention. Suitable disc recording systems would work equally well, as long as they include some means for accessing specific portions of the disc recording medium. Nonrecording tape player decks would be well suited for use with the invention. Although a color CRT is described in the preferred embodiment, the system would work with a monochrome CRT. The configuration of the keyboard control, including the type and number of key entries provided, could also be readily changed. Other changes and modifications within the scope of the present invention will occur to those skilled in the art.

The present invention provides an interactive video system suitable for instructional purposes which incorporates a video playback device capable of playing prerecorded video program material. An interactive video system has been provided which is suitable for instructional purposes and which automatically controls the operation of a video playback device to selectively display portions of an instructional video program in response to user input. A method of producing a user interactive video display using a video playback device has been provided in which different portions of a recorded video program are accessed in response to user input.

What is claimed is:

1. An interactive video display system comprising, in combination:

a video playback device adapted to respond to respective ones of a set of input control function commands either to play a prerecorded program medium to recover signal information recorded on a video signal track thereon or to fast reverse or fast forward scan said program medium while recovering medium position information from a control track thereon to produce control track pulse output signals;

a video monitor coupled to said video playback device for receiving video output signals therefrom and producing video displays corresponding thereto;

an input control signal means responsive to system user selected input commands to produce corresponding control signals; and a microcomputer system including a central processing unit, an operating program memory, a scratch pad memory, and a plurality of programmable input/output devices communicating with said central processor unit (CPU) by way of a system address bus, a system data bus, and a system control signal bus, a control track circuit coupled to said video playback device to receive said control track pulse output signals and being operative to produce a sequence of interrupt signals to said CPU in response thereto, and a data recovery circuit coupled to said video playback device to receive said video output signals therefrom for recovering data words contained therein, a first of said programmable input/output devices being coupled to said video playback device for supplying said input control function commands thereto under CPU-program control, a second of said programmable input/output devices being coupled to said input control signal means to communicate said control signals to said CPU under CPU-program control, and a third of said programmable I/O devices being coupled to said data recovery circuit to communicate data therefrom to said system data bus;

said video display system being adapted to be controlled by program information provided on said prerecorded program medium and comprising a plurality of groups of live video segments and a plurality of data dump segments with a data identifying signal preceding each data dump segment adapted to be sensed by said data recovery circuit in conjunction with said CPU to enable operation of said data recovery circuit, each of said live video segments being preceded by a data dump segment which includes at least one control word identifying the medium location thereof, and at least one of said data dump segments consisting of a software routine in the form of a prearranged sequence of control words providing a set of branching instructions for said CPU to data dump loctaions associated with selected live video segments and instructions for interpreting a predetermined set of user input commands to operatively select one of said branching instructions, said CPU thereby being responsive to one of said predetermined set of user input commands to produce either a fast reverse or forward scan function command to said video playback device until an approximate medium location corresponding to a new data dump location is reached, using said interrupt signals received from said control track circuit as a guide, followed by a play function command to said video playback device until the data dump associated with the selected branching instruction is encountered on said medium and said live video segment associated therewith is displayed on said monitor.

2. An interactive video display system as claimed in claim 1, wherein said program information includes a plurality of data dumps consisting of prearranged software routines, and said microcomputer system temporarily stores relevant portions of one of said software routines from an associated data dump in said scratch pad memory while said software routine is being executed, said scratch pad memory being at least partially rewritten with another software routine as another data dump containing such software routine is encountered on said prerecorded medium, thereby passing CPU-program control to said new software routine.

3. The system of claim 2, wherein at least some of said data dumps consisting of software routines also include alphanumeric character data blocks in single or multiple page format, and said microcomputer system further includes a character memory communicating with said CPU by way of said system address and data lines for storing said character data blocks as they are recovered by said data recovery circuit, and CRT controller circuit means for accessing said data stored in said character memory to generate CRT control signals for producing a display of said stored character data, and switch means operative under software command from said CPU to selectively switch input signals into said video monitor from said video playback device and said CRT controller circuit means.

4. The system of claim 3, wherein at least some of said data dumps which include alphanumeric character data blocks also include a control word data block containing instructions for display of associated alphanumeric characters, and said microcomputer system further includes a control word memory communicating with said CPU by way of said system address and data lines for storing said control word data blocks, and color inverting and blanking logic means responsive to said stored control words and commands received from said CPU via one of said programmable input/output devices to provide control signals to said CRT controller circuit means for blanking or color inverting selected portions of the alphanumeric characters to be displayed on said video monitor.

5. A video tape playback system comprising:

a video tape having at least one video track and one audio track with a plurality of program segments recorded on at least one of said tracks at prearranged tape locations and a control track having control track signals recorded thereon at regular intervals throughout the length of said tape, each of said program segments including at least one recorded control word comprising a precise tape location address of said program segment;

a video tape playback device adapted to respond to a set of input function control signals either to play said prerecorded video tape or to fast scan said prerecorded tape in either a forward or reverse direction, said playback device including means for recovering video signals from said video track and audio signals from said audio track in said play mode and means for recovering said control track signals from said control track during play and fast scan modes; and control circuit means coupled to said playback device for receiving said recovered video signals and control track signals and for communicating function control signals thereto, said control circuit means including data recovery means for recovering said digital control words; storage means for storing a tape location address; means responsive to said control track signals to continuously update said storage means to contain an approximate current tape location address; means responsive to a recovered control word comprising a precise tape location address to update said storage means with said precise current tape location address; means for deriving a target tape location address corresponding to the tape location of a different program segment; and means for supplying function control signals to said playback device to drive said video tape to said next program segment tape location based on the control track signal displacement between said target tape location address and said current tape location address.

6. A video tape playback system comprising:

a video tape having at least one video track and an audio track with a plurality of program segments recorded thereon at prearranged tape locations and a control track having control track signals recorded thereon at regular intervals throughout the length of said tape, each of said program segments including at least one recorded control word comprising a precise tape location address of said program segment;

a video tape playback device adapted to respond to a set of input function control signals either to play said prerecorded video tape or to fast scan said prerecorded tape in either a forward or reverse direction, said playback device including means for recovering video signals from said video track in said play mode and means for recovering said control track signals from said control track during play and fast scan modes;

a data recovery means for recovering said digital control words;

control track circuit means receiving said recovered control track pulses and being operative during said fast scan and play modes to produce interrupt signals in response thereto; and a computer system coupled to said data recovery means, said control track circuit means and said video playback device for controlling said video playback device to provide random access to said program segments, said microcomputer system comprising a central processing unit, an operating program memory coupled to said central processing unit to provide operating program instructions thereto, storage means for storing a tape location address, first interface circuit means coupling said central processing unit to said data recovery means, second interface circuit means coupling said central processing unit to said video playback device, and means for supplying to said central processing unit a target tape location address corresponding to the tape location of a different program segment, said central processing unit operating in response to operating program instructions from said operating program memory to respond to said interrupt signals from said control track circuit means to store a continuously updated approximate tape location address when said video playback device is in play or fast scan modes, to store a precise tape location address in response to a corresponding control word received from said data recovery circuit, and to respond to a target tape location address to supply function control signals to said playback device to drive said video tape to said target tape location address based on the displacement between said target tape location address and said current tape location address.

7. Apparatus as claimed in claim 6, wherein said prerecorded control words which comprise precise tape location addresses of corresponding program segments are recorded on said video track of said video tape, each of a plurality of said program segments comprises a live video segment preceded by a data dump including said precise tape location address of said program segment and one or more software control instructions; said apparatus further comprising a video display means coupled to said playback device, and said computer system further including a random access memory and switching means coupled between said playback device and said video display means, and said central processing unit being operative in response to said operating program instructions to store said software control instructions in said random access memory as they are recovered by said data recovery means and to operate said switching means in accordance with said stored software control instructions to control the supplying of recovered video signals corresponding to live video segments to said video display device.

8. Apparatus as claimed in claim 7, wherein at least one of said program segments comprises a data dump including a plurality of software control instructions and one or more alpha-numeric character data blocks organized in page format for display on said video display means; said computer system further includes a character data memory having a storage capacity for a predetermined number of pages of alphanumeric data and a character generator means adapted to receive character data from said character data memory to generate character display signals, and said switching means is coupled both to said character generator means and said playback device; said central processing unit operating in response to said program control instructions and said software control instructions to store said alphanumeric character data blocks in predefined page locations in said character data memory as they are received by said data recovery means while overwriting previously stored character data from prior data dumps, to send a selected page of said stored character data to said character generator means, and to operate said switching means to couple the output of said character generator means to said video display device to provide a display of said selected page of stored character data.

9. Apparatus as claimed in claim 7, wherein a plurality of said program segments are organized into an instructional sequence and prearranged program segment branching instructions including target tape location addresses for all possible target program segments are provided in at least some of said data dumps; and said circuit means for supplying said target tape location address includes a control signal means adapted to signal user selected inputs and means including said central processing unit for translating a predefined set of said user selected inputs into a target tape location address in accordance with said program segment branching instructions stored in said random access memory.

10. A user interactive video display system comprising, in combination:
a video playback device adapted to respond to respective ones of a set of input control function commands either to produce a play mode scanning between a program medium and a signal pickup means to recover signal information recorded on a video signal track thereon or to produce a fast forward or reverse scanning between said video signal track on said program medium and said signal pickup means;
a program medium adapted to be played on said playback device to recover program material recorded thereon, said program medium having at least one video signal track thereon containing prerecorded program material including a plurality of live video program segments and a plurality of data dumps recorded at predetermined video signal track locations with each live video program segment being associated with at least one of said data dumps, said data dumps including software control instructions with at least some software control instructions in some data dumps including instructions for interpreting sets of user selected inputs to control branching to one of a plurality of preselected other data dumps associated with other live video program segments, said program medium also having prerecorded thereon medium location control signal information enabling computer controlled random access to selected video signal track locations;
data recovery means coupled to the output of said video playback device to recover data in said data dumps;
video display means coupled to the output of said video playback device for displaying said live video program segments;
control signal means adapted to signal user selected inputs; and
programmable digital computer means interfaced to said video playback device, said data recovery means, and said control signal means, including memory means containing prearranged operating program instructions and random access memory means for storing said software control instructions as they are recovered by said data recovery means from one of said data dumps while clearing from said random access memory means at least some software control instructions recovered from previous data dumps; said digital computer means being time sequentially programmed by a combination of said stored software control instructions including said branching instructions and sets of user selected inputs to provide control function commands to said video playback device to scan sequentially to video signal track locations associated with particular data dump segments and associated live video program segments utilizing said medium location control signal information.

11. Apparatus as claimed in claim 10, wherein said data dump segments and said associated live program segments are recorded in sequential locations on said video signal track and at least one of said data dumps includes alphanumeric character data organized in page format for display on said video display device; said programmable digital computer means further including a character data memory having a storage capacity for a predetermined number of pages of alphanumeric data; a character generator means adapted to receive character data from said character data memory to generate character display signals; and switching means coupled to the outputs of said character generator means and said playback device and functioning under computer control to selectively couple one of said outputs to said video display device, said computer means operating in response to operating program instructions and software control instructions to store said alphanumeric character data blocks in predefined page locations in said character data memory as they are received by said data recovery means while overwriting previously stored character data from prior data dumps, to send a selected page of said stored character data to said character generator means, and to control said switching means to couple the output of said character generator means to said video display device to provide a display of said selected page of stored character data.

12. Apparatus as claimed in claim 11, wherein at least one of said data dumps which includes alphanumeric character data also includes software control instructions for interpreting predefined sets of user selected inputs as selecting certain pages of said alphanumeric data for display; and said computer means functions under operating program instructions and software control instructions to respond to a set of user selected inputs from said control signals means to send a selected page of said alphanumeric character data to said character generator means.

13. A method of providing random access playback of program segments recorded on one or both of the video and audio tracks of a video tape which also includes a control track having control track signals recorded thereon at regular intervals throughout the length of the tape, using a video tape playback device which is responsive to input function control signals either to play a video tape or to fast scan said tape in either forward or reverse directions and which includes means for recovering video and audio signals from respective video and audio tracks during said play mode and means for recovering said control track signals from said control track during play and fast scan modes, said method comprising:
recording said program segments at precisely defined predetermined tape locations on said video tape;
recording on said tape as part of each program segment a precise tape location address corresponding to said defined tape location of said program segment;

tracking approximate tape location in a tape location address memory during play and fast scan of said playback device by using control track signals received from said control track to continuously update said tape location address memory to an approximate current tape location address;

supplying a target tape location address corresponding to the target tape location of a different program segment;

supplying function control signals to said playback device to drive said video tape to said target tape location based on the displacement between said target tape location address and said approximate current tape location address;

recovering said precise tape location address as said different program segment is played; and updating said tape location address memory with the recovered precise tape location address.

14. A method of providing a user interactive video display system using a program medium having at least one video signal track thereon and having track location signals recorded thereon, a video playback device which is responsive to input function control signals either to play said program medium to recover video signals on said video track or to fast scan said medium in a forward or reverse direction, a video display device coupled to said video playback device, a control signal means for signaling user selected inputs, and a computer system, including a data recovery means and a random access memory means, interfaced to said playback device for recovery of data on said video signal track and for supplying function control signals thereto and interfaced to said control signal means to receive said user selected inputs, said computer system further including an operating system program which includes at least a medium location search routine enabling said computer system to utilize said track location signals to drive said video playback device to a specific video track location on said program medium; the method comprising:

recording on said video signal track of said program medium a plurality of data dumps and a plurality of live video program segments at predetermined video signal track locations with each live video program segment being associated with at least one of said data dumps for control of the playing of said live video program segment, said data dumps each including predefined software control instructions with at least some of said data dumps including instructions for automatically branching to a predefined different data dump and at least one of said data dumps including instructions for conditional branching to one of a plurality of predefined different data dumps in response to a predefined set of user selected inputs;

playing said program medium on said playback device to recover information on said video signal track;

recovering said data dumps as they are encountered on said video signal track;

storing said data dumps in said random access memory means as they are recovered by said data recovery means while clearing at least some stored data from prior data dumps;

executing said stored instructions in said data dumps, including responding to a set of user selected inputs in connection with said data dumps which include said conditional branching instructions, to produce a controlled sequence of function control signals to said video playback device and to cause said live video program segments to be recovered and displayed on said video display device in a user interactive sequence.

* * * * *